United States Patent

Demosay et al.

[15] 3,669,975

[45] June 13, 1972

[54] CERTAIN 6-METHYL-3-PYRIDYL PHOSPHATES, CORRESPONDING THIO PHOSPHATES AND DERIVATIVES THEREOF

[72] Inventors: Daniel Demosay, Villeurbanne; Daniel Pillon; Jacques Ducret, both of Lyon, all of France

[73] Assignee: Pechiney-Progil, Lyon, France

[22] Filed: Aug. 11, 1969

[21] Appl. No.: 849,139

[30] Foreign Application Priority Data

Aug. 9, 1968 Great Britain......................38,130/68

[52] U.S. Cl..................260/294.8 K, 260/296 R, 260/297 P, 424/263
[51] Int. Cl. .......................................................C07d 31/50
[58] Field of Search .....................260/296 R, 294.8 K, 297 P

[56] References Cited

UNITED STATES PATENTS 3,244,586  4/1966  Rigterink..........................260/294.8
3,478,037  11/1969  Fest et al. ..........................260/294.8

FOREIGN PATENTS OR APPLICATIONS 910,652  3/1954  Germany..............................260/297

*Primary Examiner*—Alan L. Rotman
*Attorney*—Robert E. Burns and Emmanuel J. Lobato

[57] ABSTRACT

An insecticidal composition having the formula:

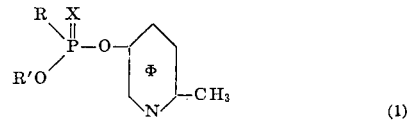

(1)

and a process for preparing it are described.

The process consists of reacting a halide salt having the formula

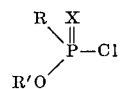

with hydroxy-4 methyl-2 pyridine.

In practical use the composition is diluted with acetone. It is active against a large variety of insects and mites.

13 Claims, No Drawings

3,669,975

CERTAIN 6-METHYL-3-PYRIDYL PHOSPHATES, CORRESPONDING THIO PHOSPHATES AND DERIVATIVES THEREOF

This application relates to insecticidal compositions. More particularly it relates to compositions based on phosphoric esters and to their use as insecticides, acaricides, nematicides and fungicides.

Phosphoric esters in accordance with the invention may be represented by the following formula.

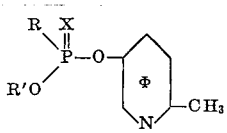

(1)

where
R is a alkyl— or alkoxy—radical containing from one to three carbon atoms, a phenyl—or a mono—or dialkoylamino-radical.
R' is a alkyl-radical containing from one to three carbon atoms.
X is oxygen or sulphur.

All compounds as defined above have remarkable pesticidal properties.

Chemical derivatives of phosphorus containing in their molecules a pyridinic radical have already been mentioned in the past, particularly in the French Pat. No. 1063067 of Apr. 19, 1952 and the German Federal Republic Pat. No. 910652 of Apr. 20, 1952. In both patents mention is made of the fact that these compounds, as most phosphoric esters, have interesting insecticidal and acaricidal properties. The compounds described in the French Pat. No. 1063067 contain (attached to the pyridyl radical) two methyl radicals in ortho-position with respect to nitrogen while the compounds mentioned in the German Pat. No. 910652 contain no substitute on the pyridyl radical.

However, work done by the applicant has shown that the compounds having formula 1 in which the nitrogen of the pyridyl radical is in position 2 with respect to the phosphorus radical and which, in addition contain a methyl radical attached to position 3 of the heterogeneous ring show insecticidal properties which are much more interesting than the previously known compounds.

Furthermore, these compounds which were never reported in literature, may be obtained from readily available materials, as is explained below, which is not the case of the compounds containing two alkoyl radicals attached to the pyridyl radical.

The compounds in accordance with the invention are prepared by reacting a chloride of a phosphorus-containing acid with methyl - 2-hydroxy-5-pyridine or with one of its alkaline salts in the presence of an inert organic solvent.

The reaction proceeds as follows:

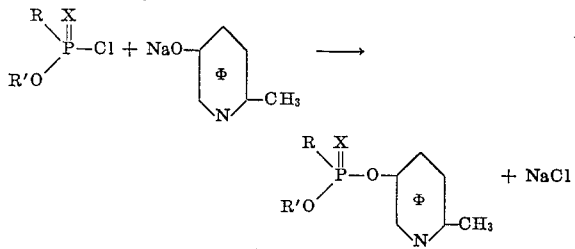

It is carried out between 20° C and 100° C. A crude reaction product is recovered after washing, drying, or distillation in high vacuum.

The 2-methyl-5 hydroxy-pyridine itself may be synthesized by known methods, particularly by the action of formaldehyde or furfurylamine in an acid medium (Niels Clauson Kaas and Max Meister, ACTA CHEMICA SCANDINAVICA 21, No. 4, p. 1104 (1967)).

The following examples will illustrate the general method of preparation mentioned above, as well as the insecticidal activity of the compounds invented.

EXAMPLE 1

Preparation of 0,0 diethyl phosphor of 0,5-(2-methylpyridine)

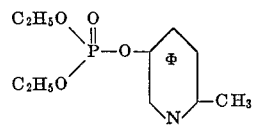

In a reaction bulb 5.173 g (0.03 mole) of diethylchlorophosphate dissolved in 80 cc of acetone is added drop wise to a suspension of 3.93 g (0.03 mole) of sodium salt of 2-methyl 5-hydroxy pyridine in 70 cc of acetone.

The mixture is allowed to stand for 30 minutes at room temperature then for 2 hours at 30°–40° C, then again at room temperature for 1 hour.

Upon cooling and elimination by filtration of the NaCl formed, the acetone is expelled. The product is extracted with the aid of chloroform, washed and dried. Chloroform is eliminated in vacuum and this yields 5.05 g of product, the efficiency being 68.6 percent.

$n_D^{20} = 1.4740$

Boiling point : 108°–110° C under 0.05 mm of Hg.
Analysis based on $C_{10}H_{16}NO_4P$ : 245
Calculated: C 48.97% H 6.53% N 5.71% P 12.65%
Found: C 48.87% H 6.67% N 5.89% P 12.84%

EXAMPLE 2

0,0-Diethyl phosphate of 0,5-(2-methylpyridine)

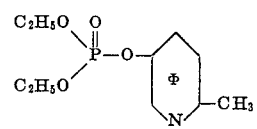

In a reaction bulb 3.77 g (0.02 mole) diethylchlorophosphate dissolved in 70 cc of acetone is added dropwise to a suspension of 2.62 g (0.02 mole) of sodium salt of methylhydroxypyridine in 80 cc of acetone.

The mixture is allowed to stand for 1 hour 15 minutes at 50°–55 C. Acetone is eliminated. The reaction product is treated with a chloroformic solution, washed and dried. Distillation yields 4.05 g of product, the efficiency being 77.6 percent.

$n_D^{20} = 1.5080$

Boiling point : 110° C under 0.08 mm of Hg
Analysis based on : $C_{10}H_{16}NO_3P$
Calculated: C 45.97% H 6.13% N 5.36% P 11.87%
Found: C 46.14% H 6.27% N 5.20% P 12.08%

EXAMPLE 3

0,0-d-n-Propyl phosphate of 0,5-(2-methylpyridine)

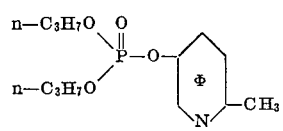

In a reaction bulb, 4.01 g (0.02 mole) of di-n-propylchlorophosphate dissolved in 70 cc of acetone is added dropwise to a suspension of 2.62 g (0.02 mole) of sodium salt methylhydroxpyridine in 80 cc of acetone.

The mixture is allowed to stand for two hours with reflux. Upon cooling and elimination of NaCl, the acetone is expelled and the reaction product is treated with a chloroformic solution. The solvent is eliminated by treatment in vacuum and the crude product obtained is washed and dried. The yield is 4.8 g, the efficiency being 87.9 percent.

$n_D^{20} = 1.4670$

Analysis based on : $C_{12}H_{20}NO_4P$: 273

Calculated: C 52.74%  H 7.32%  N 5.12%  P 11.35%
Found:      C 52.45%  H 7.63%  N 4.97%  P 11.41%

EXAMPLE 4

0,0-Diisopropyl phosphate of 0,5-(2-methylpyridine)

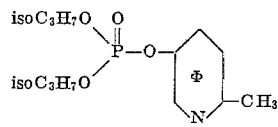

In a reaction bulb 4.01 g (0.02 mole) of di-isopropylchlorophosphate dissolved in 70 cc of acetone is added drop wise to a solution of 2.62 g (0.02 mole) of sodium salt of methylhydroxypyridine in 80 cc of acetone.

The process is identical to the one described in Example 3.

The yield of crude product is 4.8 grams, the efficiency being 87.9 percent.

$$n_D^{20} = 1.4615$$

Analysis based on : $C_{12}H_{20}NO_4P$: 273
Calculated: C 52.74%  H 7.32%  N 5.12%  P 11.35%
Found:      C 51.39%  H 7.67%  N 4.92%  P 11.49%

The following products have been obtained by similar methods:

| n° | R | R' | X | $n_d^{20}$ | Boiling pt./ mm. Hg | Eff. percent | Calculated C | H | N | P | Found C | H | N | P |
|---|---|---|---|---|---|---|---|---|---|---|---|---|---|---|
| 5 | α | $C_2H_5$ | S | 1.5825 | | 90 | 57.33 | 5.46 | 4.77 | 10.58 | 57.29 | 5.35 | 4.82 | 10.74 |
| 6 | $C_2H_5$ | $C_2H_5$ | O | 1.4885 | /0.035=100° | 70 | 52.40 | 6.98 | 6.11 | 13.53 | 52.24 | 7.05 | 5.93 | 13.4 |
| 7 | $CH_3$ | $CH_3$ | O | 1.4985 | /0.065=98° | 39.8 | 47.76 | 5.97 | 6.96 | 15.42 | 47.63 | 6.25 | 6.82 | 15.2 |
| 8 | $(CH_3)_2N$ | $C_2H_5$ | O | 1.4875 | /0.1=108° | 77 | 49.17 | 6.96 | 11.47 | 12.70 | 49.10 | 7.17 | 11.65 | 12.8 |
| 9 | iso-$C_3H_7O$ | iso-$C_3H_7O$ | S | 1.4975 | /0.05=110—112° | 70.6 | 49.82 | 6.92 | 4.84 | 10.72 | 49.73 | 6.75 | 4.66 | 10.9 |
| 10 | $CH_3$ | $CH_3$ | S | 1.5465 | | 83 | 44.23 | 5.53 | 6.45 | 14.28 | 44.43 | 5.62 | 6.31 | 14.3 |

The insecticidal properties of these compounds have been proven by numerous tests in which thy have been compared to product having a related structure cited in prior art.

The reference compounds used were those listed below:

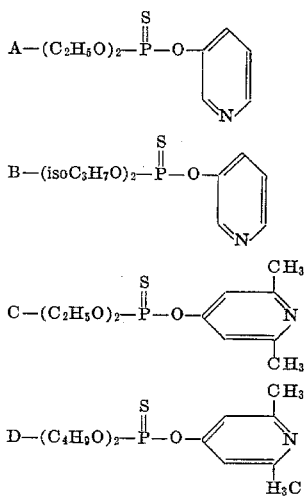

EXAMPLE 11

Test on Musca domestica

Ten adult flies, 4 to 5 days old are placed in a Petri box having a screened cover.

The boxes are treated directly by means of an atomizer with 5 cc of an acetone solution of the active material being studied.

The number of flies dead and those still alive is determined by counting 1 hour after the treatment.

Under these conditions, products 1,2,6,7, and 10 were found to kill all flies when used at a concentration of 50 mg/liter, while the known products A and B required respectively 500 and 100 mg/liter to achieve the same results.

EXAMPLE 12

Test on Ephestia kuhniella

Cachets of azymous bread (pharmaceutical models) are impregnated with three drops of an acetone solution of the product to be tested. Upon evaporation of the solvent, 10 eggs of Ephestia Kuhniella are placed in the bottom of the cachet which to avoid leakage is covered with a glass plate. Mortality is determined after 7 days.

Tabulated below for various products tested is the minimum concentration required to obtain total mortality of the insects under study. The results clearly show that the products in accordance with the invention are superior to those of the prior art.

| Product | Minimum Dose giving 100% mortality |
|---|---|
| 1 | 0.5 mg/lt. |
| 3 | 10 mg/lt. |
| 5 | 5 mg/lt. |
| 6 | 5 mg/lt. |
| 7 | 0.5 mg/lt. |
| A (known) | 50 mg/lt. |
| B (known) | 100 mg/lt. |
| C (known) | 50 mg/lt. |
| D (known) | 100 mg/lt. |

EXAMPLE 13

Test on Tetranychus urticae

Discs having a diameter of 2 cm are cut out in bean leaves carrying a population of tetranyelchus urticae at all stages.

The discs are treated, by means of an atomizer, with an acetone solution of the product to be tested, taken in various concentrations.

Two days after the treatment the percentage of mortality is determined by means of a magnifying binocular.

In this test, product 7 gives particularly interesting results since mortality is complete starting with a concentration of 0.5 mg/liter. Products 1,5,6, and 10 likewise lead to a substantial destruction of the mites with concentrations ranging from 5 to 10 mg/liter.

EXAMPLE 14

Test on Blatella germanica

Five adult cockroaches (Blatella germanica) are placed in a Petri box provided with a screened cover.

The Petri boxes are treated by means of an atomizer with 5 cc of an acetonic solution of the active material tested at various concentrations.

Mortality is observed 48 hours after treatment.

In this test, products 1,2,3,5,6, and 7 give total mortality starting with a concentration of 0.05 g/liter, while products C and D require a concentration approximately five times higher to obtain a mortality of 80 percent. Products A and B require a concentration 50 times higher in order to achieve full mortality.

In the same test, well known insecticides such as axinphosethyl (0,0-diethyl S-(4, oxo-1,2,3-benzotriazin-3[4H]-ylmethyl) phosphorodithioate or the malathion (S-[1,2-di(ethoxycarbonyl)ethyl]dimethyl phosphorothiolothionate) or the ronnel (0,0-dimethyl 0-(2,4,5-trichlorophenyl) phosphorothioate) must be utilized at concentrations of the order of 1 g/liter for a complete destruction of cockroaches.

In addition to the above laboratory tests, the products in accordance with the invention have been tested in the open under their normal conditions of use.

These tests clearly showed the compounds to be active against many kinds of insects and mites such as:

Grapeberry moth (polychrosis botrana or Clysia ambiguella)
Codling moth (Carpocapsa pomonella)
Common moth (Laspeyresia sp.)
Cabbage stem flea beetle (Psylliodes chrysocephala)
Spotted millipede (Blaniulus guttulatus or Archiboreiulus pallidus)
Midge (Contarinia tritici)
Weevil (Curculionidae)
House fly (Musca domestica)
Wheat weevil (Calandra granaria or Calandra oryzae)
Mediterranean fruit fly (Ceratitis capitata)
Blossom beetle (Meligethes aeneus)
Olive fly (Dacus ole a)
Ground fly (Psila rosae) or(hylemia antiqua or hylemia brassicae)
Noctuids (Noctuidae)
Mangold beet fly (Pegomyia betae) or (Pegomyia hyosciami)
(Sparganothis pilleriana)
European corn borer (Pyrausta nubilalis)
Spring beetle (Elateridae)
Cockchafer (may bug) (Melolontha melolontha) or Popilia sp.)
Mites (Panonychus sp.) or (Eotetranychus sp.) or (Tetranychus sp.) or (Bryobia sp.) or (Vasates sp.) or (Eriopyes sp.)
Prodenia sp. (°)
Heliothis sp. (°)
Earias sp. (°)
Diparopsis sp. (°)
Pectinophora gossypiella (°)
Dysdercus sp. (°)

The polyvalency of these compounds makes it possible to utilize them as pesticides in a large variety of agricultural arboricultural and viticultural fields, as well as in the household or the field of public health, the proper choice of the product depending on the kind of insect to be dealt with and the characteristics of the product (toxicity, activity spectrum, etc.).

In practical use, the concentrations may vary widely depending on the nature of the insects and the activity of the products.

In tests conducted in the open, some of the abovementioned compounds, namely products 1 and 2 led for a complete destruction of insects at concentrations of 5 to 10 grams of active material per hecto liter. On the other hand some other products, less active or applied against insects more difficult to destroy, concentrations of up to 100 or 200 grams may be needed for a complete annihilation of said insects.

In practice the compounds in accordance with the invention will only seldom be used pure, except for applications involving very small volumes.

Generally, the active materials will be admixed with various adjuvants, loadings or solid or liquid diluting agents order to provide formulations adapted to the needs of the user and the problem to be solved.

Depending on the case, these formulations may be granules, spraying powders or wettable powders, emulsion-forming concentrates solutions, etc. and depending on the physico-chemical characteristics of the product and its intended use.

The preparation of these formulations involves techniques which are well known to those skilled in the art and which more particularly have been developed in publications such as "Chemistry of the Pesticides" by D.E.H. FREAR, 3rd edition p.409-433 or "Fungicides" by E. TORGESON, vol. 1 chapter 6, p. 153.

What is claimed is:

1. A phosphorus compound having the formula $$\begin{array}{c} R \\ \diagdown \\ R'O \end{array} \!\! \overset{X}{\underset{\|}{P}} \!\! -O-\!\!\bigodot\!\! -CH_3$$

wherein:
R is a radical selected from the group consisting of alkyl and alkoxy containing from one to three carbon atoms, a phenyl and a mono- and di-alkylamino wherein the alkyl group contains 1-3 carbon atoms
R' is an alkyl radical of from one to three carbon atoms
X is a member selected from the group consisting of oxygen and sulphur.

2. A phosphorus compound according to claim 1 in which X is sulphur.

3. A phosphorus compound according to claim 1 in which X is oxygen.

4. A phosphorus compound according to claim 1 having the formula $$\begin{array}{c} C_2H_5O \\ \diagdown \\ C_2H_5O \end{array} \!\! \overset{O}{\underset{\|}{P}} \!\! -O-\!\!\bigodot\!\! -CH_3$$

5. A phosphorus compound according to claim 1 having the formula $$\begin{array}{c} C_2H_5O \\ \diagdown \\ C_2H_5O \end{array} \!\! \overset{O}{\underset{\|}{P}} \!\! -O-\!\!\bigodot\!\! -CH_3$$

6. A phosphorus compound according to claim 1 having the formula $$\begin{array}{c} n\!-\!C_3H_7O \\ \diagdown \\ n\!-\!C_3H_7O \end{array} \!\! \overset{O}{\underset{\|}{P}} \!\! -O-\!\!\bigodot\!\! -CH_3$$

7. A phosphorus compound according to claim 1 having the formula $$\begin{array}{c} isoC_3H_7O \\ \diagdown \\ isoC_3H_7O \end{array} \!\! \overset{O}{\underset{\|}{P}} \!\! -O-\!\!\bigodot\!\! -CH_3$$

8. A phosphorus compound according to claim 1 having the formula $$\begin{array}{c} \bigodot \\ \diagdown \\ C_2H_5O \end{array} \!\! \overset{S}{\underset{\|}{P}} \!\! -O-\!\!\bigodot\!\! -CH_3$$

9. A phosphorus compound according to claim 1 having the formula $$\begin{array}{c} C_2H_5 \\ \diagdown \\ C_2H_5O \end{array} \!\! \overset{O}{\underset{\|}{P}} \!\! -O-\!\!\bigodot\!\! -CH_3$$

10. A phosphorus compound according to claim 1 having the formula
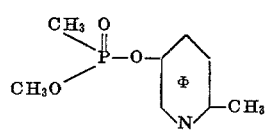
11. A phosphorus compound according to claim 1 having the formula
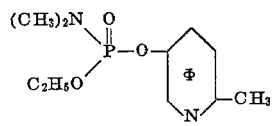
12. A phosphorus compound according to claim 1 having the formula
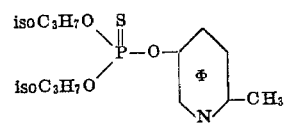
13. A phosphorus compound according to claim 1 having the formula
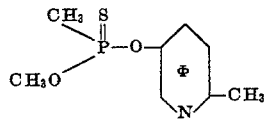
* * * * *